United States Patent [19]

Hansen

[11] Patent Number: 4,513,218
[45] Date of Patent: Apr. 23, 1985

[54] ROTOR COOLING IN ROTARY ELECTRIC MACHINES

[75] Inventor: Wayne W. Hansen, Rockford, Ill.

[73] Assignee: Sundstrand Corporation, Rockford, Ill.

[21] Appl. No.: 542,492

[22] Filed: Oct. 17, 1983

[51] Int. Cl.³ .............................................. H02K 3/46
[52] U.S. Cl. ...................................... 310/270; 310/59; 310/65; 310/198; 310/208
[58] Field of Search ............... 310/270, 269, 179, 208, 310/52-61, 64, 260, 214, 65, 195, 198

[56] References Cited

U.S. PATENT DOCUMENTS

| | | | |
|---|---|---|---|
| 2,844,746 | 7/1958 | Coggeshall | 310/270 |
| 2,951,954 | 9/1960 | Willyoung | 310/61 |
| 3,034,003 | 5/1962 | Seidner | 310/64 |
| 3,049,633 | 8/1962 | Cain | 310/61 |
| 3,189,769 | 6/1965 | Willyoung | 310/52 |
| 3,439,203 | 4/1969 | Koizumi | 310/54 |
| 3,521,094 | 7/1950 | Renz et al. | 310/58 |
| 3,622,820 | 11/1971 | Tjernstrom | 310/54 |
| 3,711,731 | 1/1973 | Pluschke | 310/53 |
| 3,743,867 | 7/1973 | Smith | 310/52 |
| 4,010,394 | 3/1977 | Lorch | 310/270 |
| 4,037,124 | 7/1977 | Kullmann | 310/52 |
| 4,037,312 | 7/1977 | Deis | 310/59 |
| 4,139,789 | 2/1979 | Hunt | 310/61 |
| 4,146,809 | 3/1979 | Rielly | 310/61 |
| 4,227,102 | 10/1980 | Rozenfeld et al. | 310/52 |
| 4,282,450 | 8/1981 | Eckels | 310/52 |
| 4,289,984 | 9/1981 | Aroshidze et al. | 310/54 |
| 4,311,932 | 1/1982 | Olson | 310/61 |

Primary Examiner—R. Skudy
Attorney, Agent, or Firm—Wood, Dalton, Phillips, Mason & Rowe

[57] ABSTRACT

A rotary electric machine including a stator in which a rotor is journalled. Coolant passages for a rotor winding are defined by the interstices between precision wound turns and winding layers to assure uniform distribution of coolant during operation to avoid mechanical balance problems and uniform cooling of components to assure long life.

3 Claims, 5 Drawing Figures

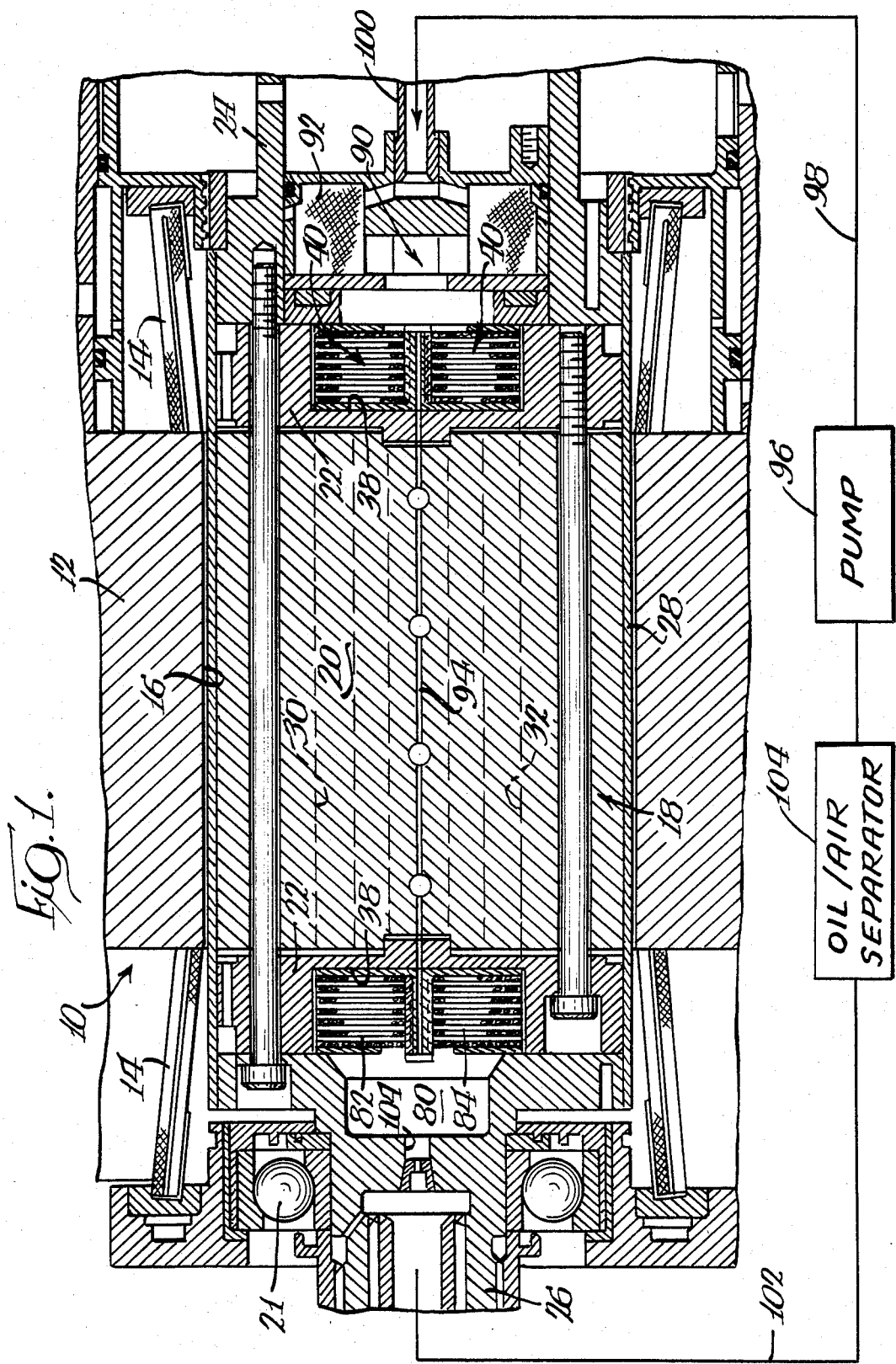

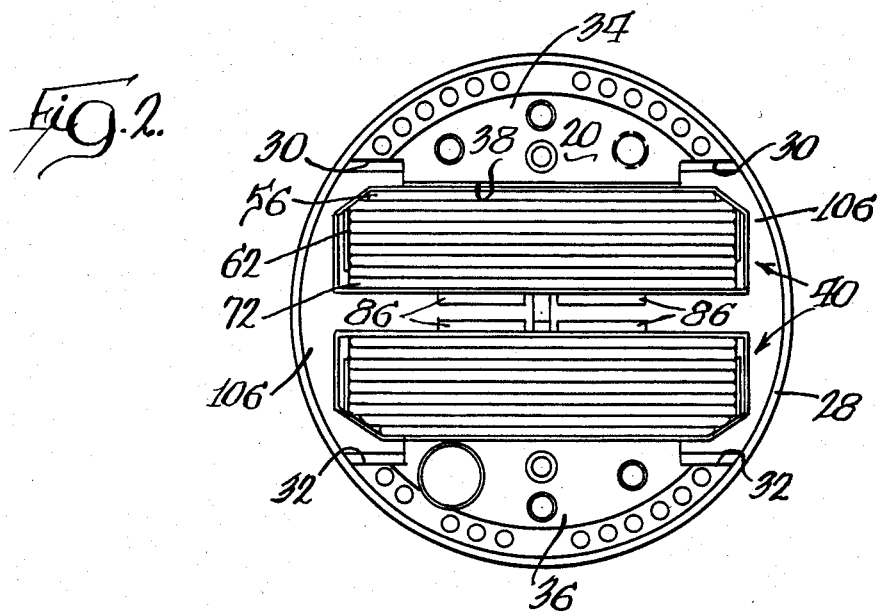
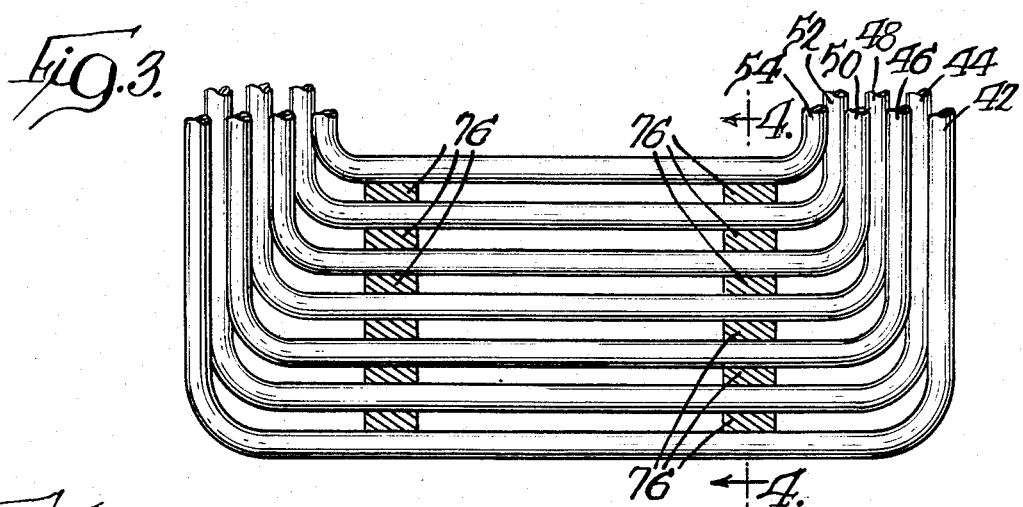
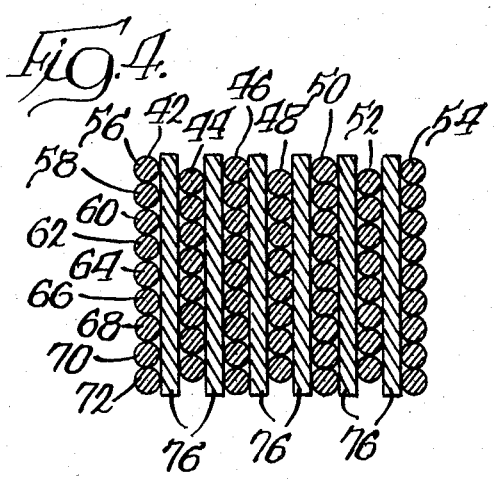
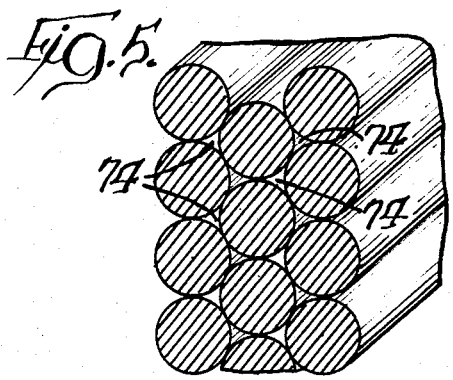

ROTOR COOLING IN ROTARY ELECTRIC MACHINES

FIELD OF THE INVENTION

This invention relates to rotary electric machines, and more particularly, to the cooling of rotor windings in such machines to achieve high operational efficiencies.

BACKGROUND ART

Prior art of possible relevance includes the following U.S. Pat. Nos.: Cain 3,049,633; Smith 3,743,867; Kullmann 4,037,124; Deis 4,037,312; and Hunt 4,139,789.

It has long been known that the efficiency of rotary electric machines can be increased by cooling the windings thereof. Generally, efforts at cooling have involved either the use of hollow electrical conductors which in turn serve as the conduits for the coolant or confining the windings in a passage and flowing the coolant through such passage such that it contacts the conductors in heat exchange relation.

The former approach, while quite effective, is quite complex mechanically and hydraulically with the result that it is quite expensive and does not lend itself well to small, lightweight application such as generators utilized in aircraft.

The latter approach also works well but as typically implemented, requires the use of mechanical spacers in the windings thereby complicating the construction and/or results in unequally sized fluid flow paths which encourage non-uniform heat transfer and create balance problems during operation of the machine where employed to cool rotor windings, particularly in high speed machines.

The present invention is directed to overcoming one or more of the above problems.

SUMMARY OF THE INVENTION

It is the principal object of the invention to provide a new and improved means for cooling rotor windings in a rotary electric machine. More specifically, it is an object of the invention to provide a rotor winding cooling system that is simple in construction, provides for uniform heat transfer, and assures a balanced coolant distribution to avoid mechanical balance problems thereby suiting the rotor for use in a high speed rotary electric machine.

An exemplary embodiment of the invention achieves the foregoing objects in a rotary electric machine including a stator having a rotor receiving opening. A rotor is journalled within the opening and includes a body of magnetizable material having at least two opposed axially extending slots. End turn supports are disposed on each end of the body and each has a radially extending, axially opening slot aligned with the slots in the body to define a continuous passage for the receipt of windings. At least one winding is disposed in the passage and is composed of a plurality of turns of an electrical conductor having a generally circular cross section. The turns of the winding are precision wound in a plurality of layers such that the interstices between the turns define uniformly sized axially extending coolant passages. Spacers are disposed in each of the slots in the end turn supports and spaced that turns of adjacent layers a sufficient distance to allow a coolant to enter into or exit from the coolant passages and means are provided for circulating a liquid coolant through the passages and the slots in the end turns supports for cooling purposes.

Preferably, the turns are precision wound in a plurality of layers such that each successive turn in a given layer is parallel to and in substantial abutment with the preceding turn and the turns in each successive layer are generally parallel and generally in abutment with at least one turn in each of the preceding and succeeding layers within the body slots.

In a highly preferred embodiment, the turns, when viewed in cross section define a honeycomb-like matrix.

Coolant galleries are disposed in each end of the rotor adjacent the end turn supports and are in fluid communication with the associated slot in the corresponding end turn support. The circulating means interconnects the coolant galleries for circulating the coolant.

Other objects and advantages will become apparent from the following specification taken in connection with the accompanying drawings.

DESCRIPTION OF THE DRAWINGS

FIG. 1 is a sectional view of a rotary electric machine, specifically a high speed generator, embodying the invention;

FIG. 2 is a side elevation of a rotor with an end turn support exposed;

FIG. 3 is an enlarged, fragmentary view illustrating the conductors forming a winding as they appear within the end turn supports;

FIG. 4 is a sectional view taken approximately along the line 4—4 in FIG. 3; and FIG. 5 is an enlarged, fragmentary view of the appearance of the windings as they appear in section along the axis of the rotor.

DESCRIPTION OF THE PREFERRED EMBODIMENT

An exemplary embodiment of a rotary electric machine is shown in the drawings and with reference to FIG. 1 is seen to be in the form of a so-called brushless generator. However, it is to be understood that the invention is not so limited, but could be applied to any rotary electric machine requiring rotor cooling.

In the preferred embodiment, the generator is intended to operate at 24,000 RPM and includes a two pole rotor as will become more fully apparent hereinafter.

The generator includes a stator, generally designated 10 including a stator core 12 and stator windings, only the end turns 14 of which are shown. The core 12 includes a central opening 16 for receipt of a rotor, generally designated 18. The rotor 18 is journalled within the opening 16 by suitable bearings at opposite ends of the rotor, one such set of bearings being illustrated at 21.

The rotor 18 includes a central body 20 formed of magnetic material. The body 20 is in turn flanked by end turn supports 22. The end turn supports 22 are secured to respective end shafts 24 and 26 which axially journal the rotor 18 within the opening 16. An exterior can or cylindrical sleeve 28 surrounds the body 20 and the end turn supports 22 as well as radially outer portions of the end shafts 24 and 26.

As seen in FIGS. 1 and 2, the body 20 includes opposed, axially extending, radially outwardly opening slots having opposite edges shown at 30 and 32. Thus, that portion of the body 20 between the slot edges 30 and shown at 34 in FIG. 2 forms one pole of the rotor while the opposite portion shown at 36 in FIG. 2 forms the remaining pole.

Each of the end turn supports 22 includes a radially extending, axially opening slot 38 (FIGS. 1 and 2) and it will be appreciated from a consideration of FIGS. 1 and 2 that the slots 38 in the end turn supports 22 along with the slot defined by the edges 30 and 32 define a continuous, closed loop passage for receipt of the rotor winding, generally designated 40.

As seen in FIGS. 3 and 4, the winding 40 is made up of a plurality of layers 42, 44, 46, 48, 50, 52 and 54. And as can be seen in FIG. 4, each of the layers 42–54 is made up of several turns. With relation to the layer 42, the turns are shown at 56, 58, 60, 62, 64, 66, 68, 70 and 72. The layers 44–54 have a similar number of turns.

The entire winding 40 is made of any suitable electrical conductor having a generally circular cross-section provided, of course, with suitable insulation (not shown). The turns and the layers are precision wound in the passage. The term precision wound is intended in its usual sense and is opposed to random winding wherein no particular effort is made to assure that each successive turn be wound in a particular location.

In the usual case, precision winding will dictate that each successive turn in a given layer is parallel to and in substantial abutment with the preceding turn and that the turns in each successive layer are parallel to and in abutment with at least one turn in the preceding layer. Generally speaking, in order to maximize the number of turns that may be received in a slot of given cross section, it is desirable that the turns of each successive layer additionally are in abutment with two turns in both the preceding and the succeeding layer to define a honeycomb-like matrix of conductors as is illustrated somewhat fragmentarily in FIG. 5.

As can be seen in that Figure, the precision winding results in a plurality of interstices 74 between each triangular array of three conductors whrch are uniform in size. Such interstices 74 define coolant passages for a cooling fluid to cool the winding 40. In other words, precision winding results in interstices between the various turns defining uniformly sized coolant passages.

As can be appreciated from a consideration of FIGS. 1 and 5, the coolant passages defined by the interstices 74 extend axially of the rotor body 20. It will also be appreciated that due to the contact between adjacent conductors or turns, means must be provided whereby coolant can achieve access to or egress from the interstices 74.

Referring now to FIGS. 3 and 4, this is achieved through the use of spacers 76 disposed between each of the layers 42–54 at the end turns of the winding, namely, those portions of the winding that extend radially within the slot 38 in each of the end turn supports 22. The spacers 76 are shown in somewhat exaggerated form in the drawings but their size only need be sufficient to space the turns of adjacent ones of the layers a sufficient distance to allow coolant to enter into or exit from the interstices 74 of the axially extending portion of the winding.

Returning to FIG. 1, the end shaft 26 adjacent the left-most end turn support 22 includes an interior gallery 80 which is in fluid communication with the radially inner portion of the associated slot 38 between upper and lower sets 82 and 84 of the winding 40. Reliefs such as shown at 86 in FIG. 2 extending axially inwardly from the layer 42 to the layer 54 assure that fluid communication from the interstices 74 through the spaced end turns of the winding to the gallery 80 is provided.

A similar gallery, generally designated 90 is provided adjacent the right-hand end turn supports 22 and by similar means is in fluid communication with the interstices 74 at that axial end of the winding. The gallery 90 may include other components including, for example, a centrifugal filter 92 and various means including an air vent passage 94 which forms no part of the present invention.

A pump 96 is connected by a conduit 98 to a transfer tube 100 to the gallery 90. A conduit 102 suitably connected to the interior of the end shaft 26 and thus in fluid communication with the gallery 80 via a bore 104 is connected to an air/oil separator 104 which in turn is connected to the pump 96. Thus, the pump 96 is operative to circulate a coolant, typically oil, to the gallery 90, through the slots 38 in the rightmost end turn support 22 to the interstices 74. The coolant, after cooling the winding, will emerge from the interstices 74 within the leftmost end turn support 22 to flow to the gallery 80 where it will be returned to the pump 96. Typically, a suitable heat exchanger (not shown) will be included in the circuit.

The winding 40 is maintained in the slots defined by the edges 30 and 32 in the body 20 by conventional wedges 106 and the entire interior of the rotor, specifically, the rotor body 20 is sealed by the can 28 to prevent leakage of oil to the air gap between the rotor 18 and the stator 10.

From the foregoing, it will be appreciated that a rotor construction made according to the invention is ideally suited for lightweight high speed applications such as aircraft generators. The system is simple in construction, avoiding the need for hollow conductors serving as coolant conduits. Importantly, the use of a precision wound winding assures that the interstices 74 forming the coolant passages are uniformly sized in cross section to provide two distinct advantages. The first advantage is that of assurance of uniform distribution of the coolant throughout the rotor to avoid mechanical balance problems particularly when the machine is operating at high speed. The second advantage is that uniform cooling is achieved since the flow rate through each of the interstices 74 will be substantially equal, thereby preventing undesirable hot spots from developing.

I claim:

1. In a rotary electric machine the combination of:
    a stator having a rotor receiving opening;
    a rotor journalled within said opening, said rotor including
        a body of magnetizable material having at least two opposed axially extending slots
        an end turn support on each end of said body, each having a radially extending axially opening slot aligned with the slots on said body to define a continuous passage for the receipt of windings
        at least one winding in said passage and composed of a plurality of turns of an electrical conductor having a generally circular cross section, said turns being precision wound in a plurality of layers such that each successive turn in a given layer is parallel to and in substantial abutment with the preceding turn and such that the turns in each successive layer are parallel to and in abutment with at least one turn in the preceding layer within said body slots, the interstices between said turns defining axially extending coolant passages, spacers in each of said slots in said end turn supports spacing the turns of adjacent layers a sufficient distance to allow a coolant to enter into or exit from said coolant passages, and a pair of coolant galleries, one for each end turn support and in fluid communication with the associated slot in the corresponding end turn support; and means interconnecting each of said galleries for circulating a liquid coolant between the same via said coolant passages and said slots in said end turn supports.

2. The rotary electric machine of claim 1 wherein said turns in said body slots define a honeycomb-like matrix when viewed in cross section.

3. In a rotary electric machine the combination of:

a stator having a rotor receiving opening;

a rotor journalled within said opening, said rotor including a body of magnetizable material having at least two opposed axially extending slots an end turn support on each end of said body, each having a radially extending axially opening slot aligned with the slots on said body to define a continuous passage for the receipt of windings at least one winding in said passage and composed of a plurality of turns of an electrical conductor having a generally circular cross section, said turns being precision wound in a plurality of layers such that each successive turn in a given layer is parallel to and in substantial abutment with the preceding turn and such that the turns in each successive layer are parallel to and generally in abutment with two turns in each of the preceding and succeeding layer within said body slots, the interstices between said turns defining axially extending coolant passages, radially extending spacers in each of said slots in said end turn supports spacing the turns of adjacent layers a sufficient distance to allow a coolant to enter into or exit from said coolant passages, and a pair of coolant galleries, one for each end turn support and in fluid communication with the associated slot in the corresponding end turn support; and means interconnecting each of said galleries for circulating a liquid coolant between the same via said coolant passages and said slots in said end turn supports.

* * * * *